United States Patent [19]
Griffin

[11] 4,378,388
[45] Mar. 29, 1983

[54] METHOD OF USING SUPER-HEATED VAPOR FOR DRYING SOLVENT-TREATED TIRE CORD FABRIC

[75] Inventor: Theodore F. Griffin, Barberton, Ohio

[73] Assignee: The Goodyear Tire & Rubber Company, Akron, Ohio

[21] Appl. No.: 213,752

[22] Filed: Oct. 30, 1980

Related U.S. Application Data

[60] Continuation of Ser. No. 17,718, Mar. 5, 1978, abandoned, which is a continuation of Ser. No. 836,270, Sep. 26, 1977, abandoned, which is a continuation of Ser. No. 538,674, Jan. 6, 1975, abandoned, which is a division of Ser. No. 463,956, Apr. 25, 1974, Pat. No. 3,908,585.

[51] Int. Cl.³ .............................................. B05D 3/04
[52] U.S. Cl. ......................................... 427/335; 34/77; 34/78; 118/61
[58] Field of Search ...................... 427/335; 34/77, 78; 118/61

[56] References Cited

U.S. PATENT DOCUMENTS

| | | | |
|---|---|---|---|
| 3,510,954 | 5/1970 | Dunn | 34/77 |
| 3,908,285 | 9/1975 | Ryan et al. | 34/77 |

*Primary Examiner*—Shrive P. Beck
*Attorney, Agent, or Firm*—Frank Pincelli

[57] ABSTRACT

An apparatus for drying tire cord fabric dipped in a liquid coating containing a vaporizable solvent. The drying chamber of the apparatus includes a boiling sump for filling the chamber with solvent vapor, and a plurality of vertically elongated plenums mounted in side-by-side relation, each plenum having a number of horizontally elongated nozzles in vertically spaced relation. The tire cord fabric is passed adjacent the nozzles and super-heated solvent vapor is forced through the nozzles against the moving fabric to flash off or vaporize the solvent carried by the fabric, thereby drying the fabric.

4 Claims, 2 Drawing Figures

METHOD OF USING SUPER-HEATED VAPOR FOR DRYING SOLVENT-TREATED TIRE CORD FABRIC

This is a continuation of application Ser. No. 017,718 filed on Mar. 5, 1978 now abandoned, which is a continuation of prior filed application Ser. No. 836,270 (now abandoned) filed Sept. 26, 1977 which is a continuation of U.S. Ser. No. 538,674 filed Jan. 6, 1975 and now abandoned, which is a divisional of U.S. Ser. No. 463,956 filed Apr. 5, 1974, which has issued to U.S. Pat. No. 3,908,585.

BACKGROUND OF THE INVENTION

The invention is particularly well suited for use in treating tire cord fabric, especially fabric having warp cords composed of nylon, polyester, or metal. It is desirable coating such tire cords with a substance or agent which promotes the bond between the cords and rubber material used in the production of tires. One such method advantageously employs a liquid solvent as a carrier for bringing the bonding agent into contact with the warp cords. This particular method has never been used to a great extent in the past, because of the high cost of the solvent and the inability to recapture the solvent after deposition of the agent on the warp cords. In some known processes, the tire cord fabric is dipped in a liquid mixture of solvent and agent and then passed into a chamber, filled with solvent vapor, where the fabric contacts hot cans or heated rollers for vaporizing the solvent, carried by the fabric, to dry the fabric. The vaporized solvent is then removed and reconditioned for reuse in the process. Impurities in the solvent mixture react unfavorably when the fabric contacts the hot cans, causing undesirable deposits on the hot cans, necessitating frequent stoppage of the process to clean or replace the contaminated hot cans.

Other methods, more suitable for treating tire cord fabric on a production basis, employ super-heated solvent vapor, rather than hot cans, for contacting the fabric to heat and evaporate the solvent. It has been found that using the latter method increases the rate at which the fabric can be processed which, from an economical standpoint, is very important. Although the use of super-heated solvent vapor produces beneficial results, a highly efficient apparatus for treating the fabric and recovering solvent vapor has not been found. The invention is directed to providing such an apparatus.

Briefly stated, the invention is in an apparatus for treating tire cord fabric. Means are provided for coating the tire cord fabric with a liquid coating comprising a mixture of an agent which promotes the bond between the warp cords of the fabric and rubber material used in the production of tires, and a vaporizable solvent which is a carrier of the agent. A drying chamber is supplied adjacent the fabric coating means and is sealed from the ambient atmosphere and said means. The drying chamber has inlet and outlet openings through which the tire cord fabric passes as it moves into and out of the drying chamber. A condenser is disposed adjacent each of the openings for condensing excess solvent vapor in the drying chamber. Means are provided for filling the drying chamber with a vapor of a solvent similar to the solvent of the mixture. A plurality of vertically elongated plenums are disposed side-by-side in the drying chamber, and a number of vertically spaced nozzles extend from each of the plenums for directing super-heated vapor of a solvent, similar to the solvent of the mixture, against tire cord fabric guided past the nozzles. Means are provided for continually removing solvent as a vapor from the drying chamber, and superheating the removed solvent vapor for subsequent passage through the nozzles. Also provided are means for removing the condensed solvent vapor from the drying chamber for reconditioning and reuse in the process, such reconditioning including separating condensed solvent from impurities, such as water, and reusing the purified solvent in a new mixture.

DESCRIPTION OF THE DRAWING

The following description of the invention will be better understood by having reference to the annexed drawing, wherein.

DESCRIPTION OF THE INVENTION

Figure 1:
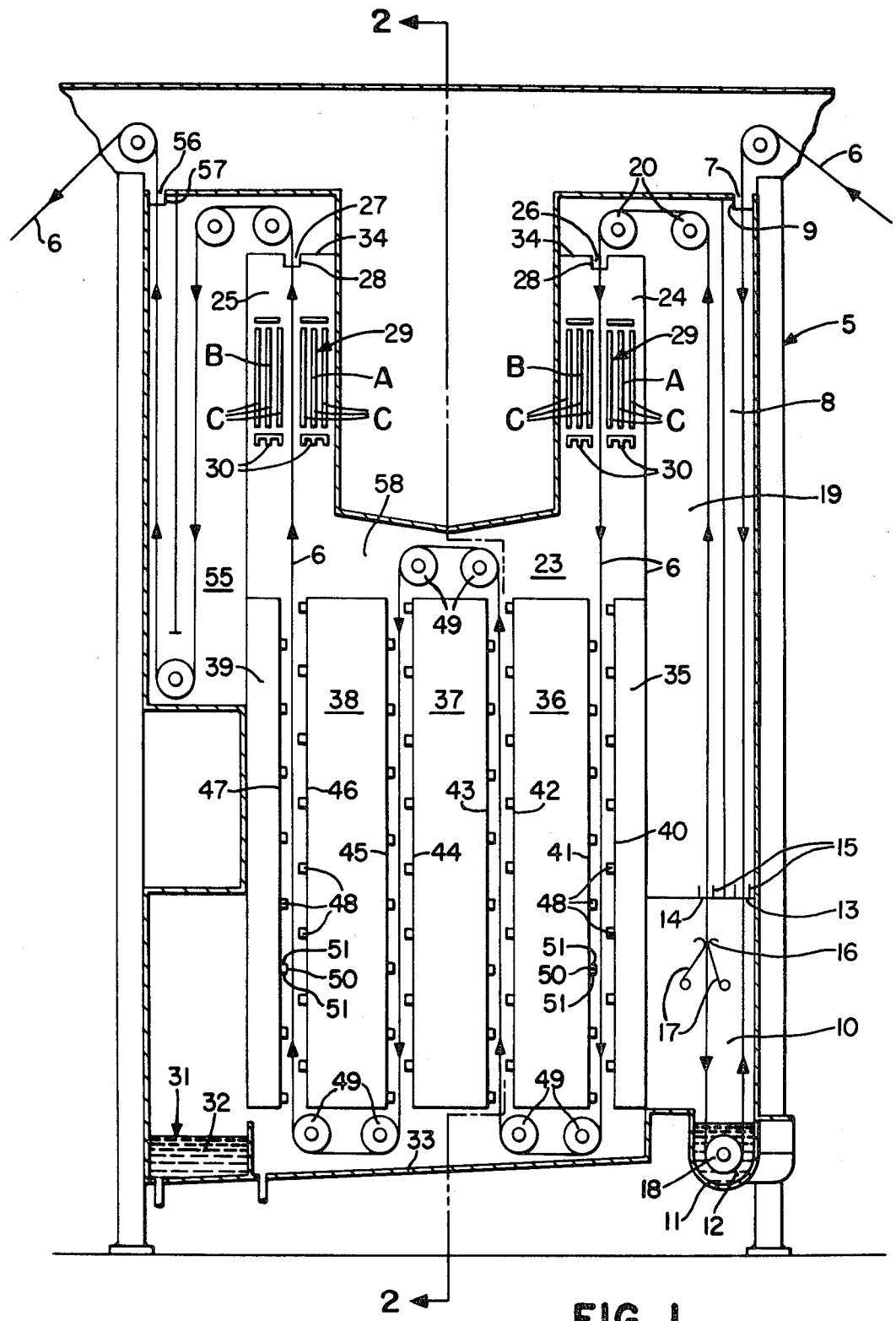
FIG. 1 is a cross-section of an apparatus made in accordance with the invention.

Referring generally to the drawing, there is shown an apparatus 5 for treating tire cord fabric 6 with a material or agent for increasing or promoting the bond between the warp cords of the fabric 6 and rubber material used in the production of tires. The tire cord fabric 6 is taken from the ambient atmosphere and moved downwardly through an inlet 7 into a long narrow entry compartment 8. The fabric 6 passes through an appropriate flap seal 9 which is provided in the inlet 7 for sealing the entry compartment 8 from the ambient atmosphere.

The tire cord fabric 6 continues downwardly into an enclosed chamber 10 which contains a dip tank 11 filled with a liquid coating 12 composed of a mixture of the agent and any suitable, chemically compatible solvent which, when vaporized, is preferably heavier than air. The dip chamber 10 abuts the entry compartment 8 and is provided with an entrance opening 13 through which the fabric 6 moves from the entry compartment 8 into the adjacent dip chamber 10. An exit opening 14 is disposed in the dip chamber 10 in spaced relation from the entrance opening 13. The entrance and exit openings 13 and 14 are also provided with suitable seals 15 for sealing the dip chamber 10 from the ambient atmosphere and adjacent compartments.

A scraper blade assembly 16, including a pair of similar wiper blades 17 for compressibly engaging the fabric 6, is provided between the dip tank 11 and exit opening 14 for removing excess liquid coating 12 from the fabric 6 shortly after it leaves the dip tank 11. An applicator roll 18 is rotatably mounted in the dip tank 11 and directs the fabric 6 into the liquid coating 12.

The liquid-coated fabric 6 moves from the chamber 10 upwardly through a secondary compartment 19 which is also isolated or sealed from the ambient atmosphere or adjacent processing chambers. The secondary compartment 19 is sufficiently long, giving the liquid coating 12 time to set up on the fabric 6. The fabric 6 passes over a pair of head pulleys or rollers 20 into the main processing chamber 23 where the fabric 6 is heated and dried.

The drying chamber 23, as best seen in FIG. 1, has a greater height measured vertically than a width measured horizontally. Moreover, the upper portion of the drying chamber 23 is generally U-shaped, having a pair of upstanding chimneys which form elongated, restricted throat sections 24 and 25. The throat sections 24 and 25 are provided with inlet and outlet openings 26 and 27 through which the fabric 6 passes as it moves into and out of the drying chamber 23. A seal 28 is provided in each of the openings 26 and 27 for sealing the drying chamber 23 from the ambient atmosphere and adjacent compartments. The seals 28 have a twofold purpose; namely, to keep air out of the drying chamber 23 and prevent the passage of solvent vapor from the drying chamber 23.

A condenser 29 is mounted in each of the chimneys 24 and 25 for condensing solvent vapor accumulating near the openings 26 and 27 to prevent the escape of solvent vapor from the drying chamber 23. Each of the condensers 29 comprises two sets A and B of plate coils C, between which the fabric 6 is guided. Each of the sets A and B includes, in this embodiment, three separate plate coils C which are vertically mounted in parallel relation such that they laterally fill the chimneys 24 and 25 to more effectively remove excess solvent vapor. A discharge pipe assembly 30 is associated with each set A and B of condensers 29 for receiving condensed solvent vapor and carrying it from the drying chamber 23 to a remote point for reconditioning and recycling. A number of strategically located baffles b are positioned below each of the condensers 29 to reduce the rate at which solvent vapor flows through the condensers 29 to eliminate possible turbulence in the flow of solvent vapor, such that the vapor will contact the condensers 29 more intimately, producing more effective condensation of the vapor in the chimneys 24 and 25.

A boiling sump 31, filled with liquid solvent 32 is provided adjacent the bottom 33 of the drying chamber 23 in spaced relation from the inlet and outlet openings 26 and 27 which are located in the top 34 of the drying chamber 23. The liquid solvent 32 in the boiling sump 31 is the same as that used in the liquid coating 12. Any suitable means are used for heating the liquid solvent 32 in the boiling sump 31 to a temperature sufficient to vaporize the solvent 32 and fill the drying chamber 23 with solvent vapor to eliminate any non-condensable gas, such as air, in the drying chamber 23.

A plurality of vertically elongated heat plenums 35-39 are disposed side-by-side in the drying chamber 23. Each of the plenums 35-39 are preferably wider than the corresponding width of the fabric 6. The adjacent opposing faces 30 and 41 of plenums 35 and 36, faces 42 and 43 of plenums 36 and 37, faces 44 and 45 of plenums 37 and 38, and faces 46 and 47 of plenums 38 and 39, are each provided with a number of nozzles 48 for directing superheated solvent vapor against the fabric 6 moving between the plenums 35-39 and past the nozzles 48. The fabric 6 is directed past the nozzles and between adjacent plenums 35-39 by a number of strategically located rollers 49.

The oppositely faced nozzles 48 of adjacent plenums, as best seen in FIG. 1, are vertically staggered and not directly across from each other. The nozzles 48 are preferably similar in design and formed by horizontally disposed slots or openings 50 which are at least coextensive with the width of the fabric 6 being treated. Deflectors 51 extend from opposing sides of each of the nozzle openings 50 and channel the streams of superheated solvent vapor against the fabric 6 moving between the plenums 35-39.

Figure 2:
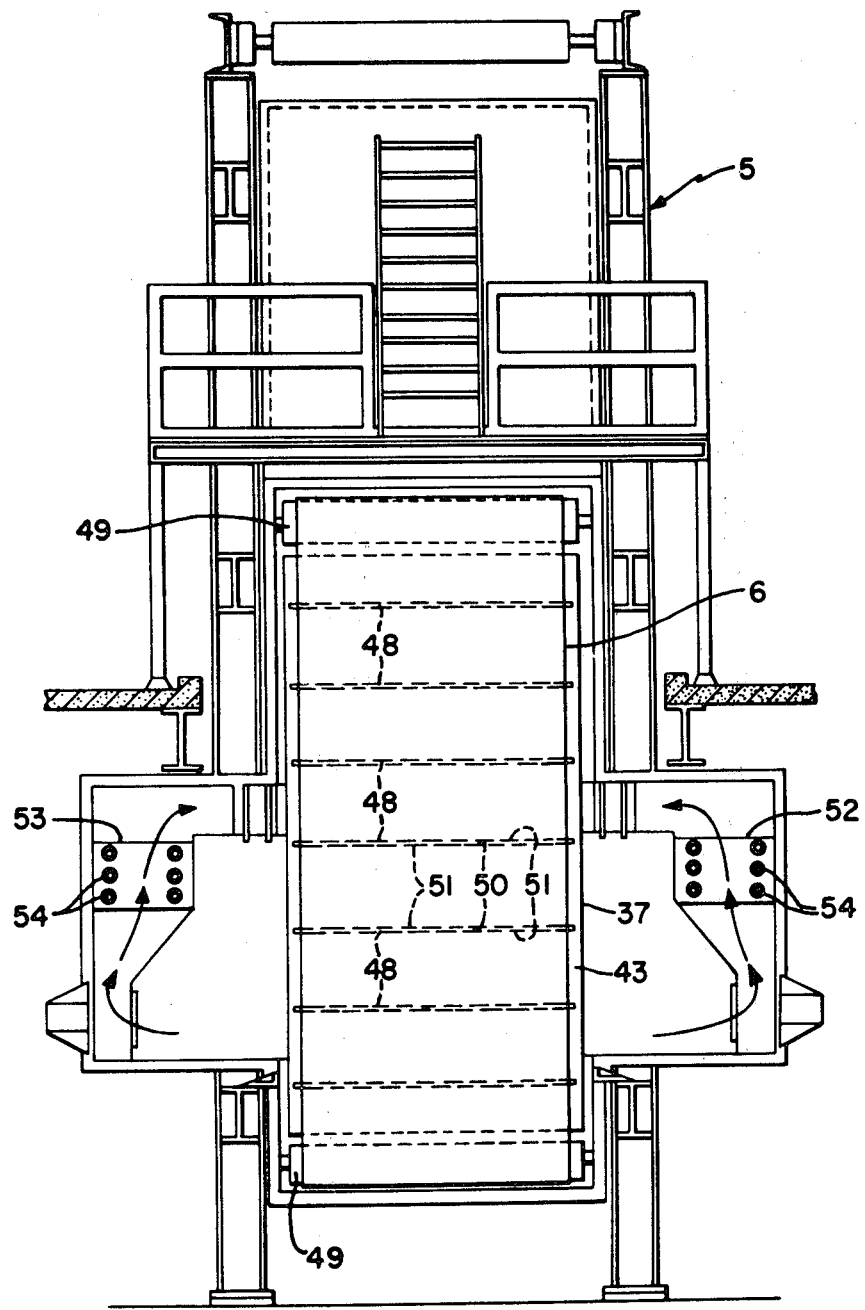
FIG. 2 is a section of the apparatus viewed from the line 2—2 of FIG. 1.

A portion of the solvent vapor in the drying chamber 23, is forced by strategically located high-powered fans through heat exchangers 52 and 53 (FIG. 2) which are located adjacent the drying chamber 23 and coupled to the plenums 35-39. The heat exchangers 52 and 53 are each provided with steam coils 54 for superheating the vaporized solvent to about 250° F. for circulation to the plenums 35-39. Thus, solvent is continually removed from the drying chamber 23 as a vapor which is immediately superheated and recirculated to the drying chamber 23 for contacting fabric 6 moving through the drying chamber 23. This produces a well-balanced system in which the processing conditions within the drying chamber 23 are easily maintained, since all superheated solvent vapor used in the treatment of the fabric 6 is formed from solvent vapor already in the drying chamber 23.

The superheated solvent vapor impinges against the fabric 6 and flashes off or evaporates solvent carrier on the fabric 6, whereby the fabric is dried and the bonding agent deposited on the fabric. The dried fabric 6 then moves from the drying chamber 23 through the fabric outlet 27 into an adjacent discharge compartment 55 which is also sealed from the ambient atmosphere and drying chamber 23. The discharge compartment 55 is provided with a discharge opening 56 and seal 57 through which the fabric 6 passes as it moves into the ambient atmosphere for winding on a standard take-up device, or into other chambers for further treatment.

The solvent vapor, condensed by the condensers 29, is removed from the drying chamber 23 through the discharge pipe assemblies 30 to a conventional separator where the solvent is separated from impurities, such as water. The purified solvent is then piped to a storage tank for future use in a new mixture of liquid coating, or in the boiling sump 31.

Thus, there is provided an apparatus which is especially suitable for using a solvent in a process for treating the warp cords of tire cord fabric with a bonding agent. The nozzles of the different plenums are in close proximity to the moving fabric, such that the streams of superheated solvent vapor pouring from the nozzles, rapidly flash off the solvent to dry the fabric. The apparatus employs a number of heating plenums in which different processing conditions can be created to vary the treatment of the fabric as it passes adjacent the openings of the nozzles extending from the plenums. Moreover, the drying chamber of the apparatus is designed such that the highly pressurized superheated solvent vapor pouring from the nozzles, is allowed to expand freely in the enlarged upper portion 58 of the drying chamber 23. This has a muffling or baffling effect on the streams of vapor which can cause unwanted currents. These unwanted currents can sweep solvent vapor past the condensers 29 without being condensed. The movement of solvent vapor through the condensers is also slowed appreciably as the solvent vapor contacts the baffles in the chimneys or throat sections 24 and 25 which are small in relation to the enlarged drying or expansion chamber 23 and remove the condensers 29 out of the general flow pattern of the solvent vapor in the drying chamber 23. The configuration of the drying chamber and the particular location of the condensers 29 help in recovering a greater amount of solvent which, because of its cost, is of prime importance.

What is claimed is:

1. A method of treating tire cord fabric comprising the steps of:
   (a) coating the fabric with a liquid mixture of an agent for promoting the bond between warp tire cords of the fabric and rubber material used in the production of tires, and a solvent which is vaporizable, chemically compatible with the agent, and a carrier of the agent;

(b) removing excess liquid mixture from said fabric;

(c) moving the liquid coated fabric through a chamber filled with vapor of a solvent which is similar to the solvent of the mixture, said chamber having an upper portion and lower portion;

(d) impinging both sides of the liquid-coated fabric continuously across its entire width with successive streams of highly pressurized superheated vapor of a solvent which is identical to the solvent of the mixture from nozzles at fixed spaced intervals, disposed in the lower portion of said chamber; said fixed intervals on one side being staggered in position with respect to said fixed intervals on said other side of said fabric, said streams of superheated vapor being allowed to freely expand in the enlarged upper portion of said chamber; and (e) continually removing some of the solvent vapor through which the fabric moves, and superheating the removed solvent vapor for providing all of the streams of superheated solvent vapor impinging the fabric.

2. The method of claim 1, which includes continually condensing some of the solvent vapor, and removing the condensed solvent vapor for conditioning and reuse in a liquid mixture of solvent and bonding agent.

3. The method of claim 1, wherein condensed solvent vapor is conditioned by separating solvent from impurities in the condensed solvent vapor.

4. The method of claim 1, which includes baffling the flow of solvent vapor just prior to condensing said vapor to more effectively condense said vapor.

* * * * *

UNITED STATES PATENT AND TRADEMARK OFFICE
CERTIFICATE OF CORRECTION

PATENT NO. : 4,378,388
DATED : 3-29-83
INVENTOR(S) : Theodore F. Griffin et al

It is certified that error appears in the above-identified patent and that said Letters Patent is hereby corrected as shown below:

On the title page Item (75) Inventors' should read:

-- Theodore F. Griffin, Barberton, Ohio: Edward E. Hunter, Akron, Ohio, and Grover W. Rye, Cuyahoga Falls, Ohio --.

Signed and Sealed this

Thirtieth Day of August 1983

[SEAL]

Attest:

*Attesting Officer*

GERALD J. MOSSINGHOFF

*Commissioner of Patents and Trademarks*